(12) United States Patent  
Johri et al.

(10) Patent No.: US 9,800,421 B2  
(45) Date of Patent: *Oct. 24, 2017

(54) METHODS AND APPARATUS FOR NETWORK MULTICASTING USING HIERARCHICAL REPLICATION

(71) Applicant: AT&T Intellectual Property I, L.P., Atlanta, GA (US)

(72) Inventors: Pravin Kumar Johri, Aberdeen, NJ (US); Huajin Jeng, Middletown, NJ (US); Samir Saad, Ocean, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/860,261

(22) Filed: Sep. 21, 2015

(65) Prior Publication Data

US 2016/0013949 A1    Jan. 14, 2016

Related U.S. Application Data

(63) Continuation of application No. 12/963,338, filed on Dec. 8, 2010, now Pat. No. 9,148,362.

(51) Int. Cl.
*H04L 12/18* (2006.01)
*H04L 12/761* (2013.01)

(52) U.S. Cl.
CPC .......... *H04L 12/18* (2013.01); *H04L 12/1854* (2013.01); *H04L 45/16* (2013.01)

(58) Field of Classification Search
None
See application file for complete search history.

(56) References Cited

U.S. PATENT DOCUMENTS 7,263,099 B1    8/2007   Woo et al.
7,373,394 B1    5/2008   Li et al.
(Continued)

OTHER PUBLICATIONS

Jiang et al., "A Hierarchical Overlay Multicast Network," Department of Electrical and Computer Engineering, The University of New Mexico, Feb. 22, 2005, (4 pages).

(Continued)

*Primary Examiner* — Hassan Phillips
*Assistant Examiner* — Saba Tsegaye
(74) *Attorney, Agent, or Firm* — Hanley, Flight & Zimmerman, LLC

(57) ABSTRACT

Example methods disclosed herein include registering a first leaf node to receive multicast data from a source via a first network node in response to receiving, from the first leaf node, a first message addressed to an anycast address, the anycast addressed being assigned to the first network node to associate the first network node with a second hierarchical level of a replication hierarchy. The disclosed example methods also include receiving the multicast data from a second network node associated with a first hierarchical level of the replication hierarchy. The disclosed example methods further include, after registering the first leaf node with the first network node, replicating the multicast data to generate copies of the multicast data to be transmitted via respective unicast paths to respective ones of a plurality of leaf nodes, including the first leaf node, registered with the first network node to receive the multicast data.

20 Claims, 9 Drawing Sheets

(56) References Cited

U.S. PATENT DOCUMENTS

| | | | |
|---|---|---|---|
| 7,420,972 | B1 | 9/2008 | Woo et al. |
| 7,801,136 | B2 | 9/2010 | Tian |
| 2002/0150094 | A1 | 10/2002 | Cheng et al. |
| 2004/0107234 | A1 | 6/2004 | Rajahalme |
| 2005/0198367 | A1 | 9/2005 | Ettikan |
| 2006/0242311 | A1 | 10/2006 | Mai et al. |
| 2007/0025276 | A1* | 2/2007 | Zwiebel ............ H04L 12/1836 370/256 |
| 2009/0240813 | A1 | 9/2009 | Chun |
| 2012/0076067 | A1* | 3/2012 | Yao .................... H04L 12/189 370/312 |
| 2012/0147885 | A1 | 6/2012 | Johri et al. |

OTHER PUBLICATIONS

Kuri et al., "Hierarchical Infrastructure-based Overly Network for Multicast Services," France Telecom R&D, ITC 20th, 2007, (11 pages).

"Anycast Rp," Cisco Systems, Nov. 19, 2001, (6 pages).

Rosen et al., "Multicast in MPLS/BGP IP VPNs," IETF Trust, Network Working Group, Internet Draft, draft-ietf-l3vpn-2547bis-mcast-10.txt, Jan. 28, 2010, (89 pages).

Aggarwal et al., "BGP Encodings and Procedures for Multicast in MPLS/BGP IP VPNs," IETF Trust, Network Working Group, Internet Draft, draft-ieft-l3vpn-2547bis-mcast-bgp-08.txt, Oct. 1, 2009, (61 pages).

Thaler et al., "Automatic IP Multicast Without Explicit Tunnels (AMT)," IETF Trust, Network Working Group, Internet Draft, draft-ieft-mboned-auto-multicast-10, Mar. 7, 2010, (40 pages).

"Route Reflector," Wikipedia, http://en.wikipedia.org/wiki/Route_reflector, Sep. 17, 2010, (1 page).

"Route Refectors—for Added Hierarchy," Jupiter Networks, Inc., http://www.juniper.net/techpubs/software/jseries/junos92/jseries-config-guide-basic/route-reflectorsforadded-hierarchy.html, accessed on Nov. 30, 2010, (3 pages).

United States Patent and Trademark Office, "Non-Final Office Action", issued in connection with U.S. Appl. No. 12/963,338, dated Oct. 10, 2013 (12 pages).

United States Patent and Trademark Office, "Final Office Action", issued in connection with U.S. Appl. No. 12/963,338, dated May 9, 2014 (13 pages).

United States Patent and Trademark Office, "Notice of Allowance", issued in connection with U.S. Appl. No. 12/963,338, dated May 20, 2015 (14 pages).

* cited by examiner

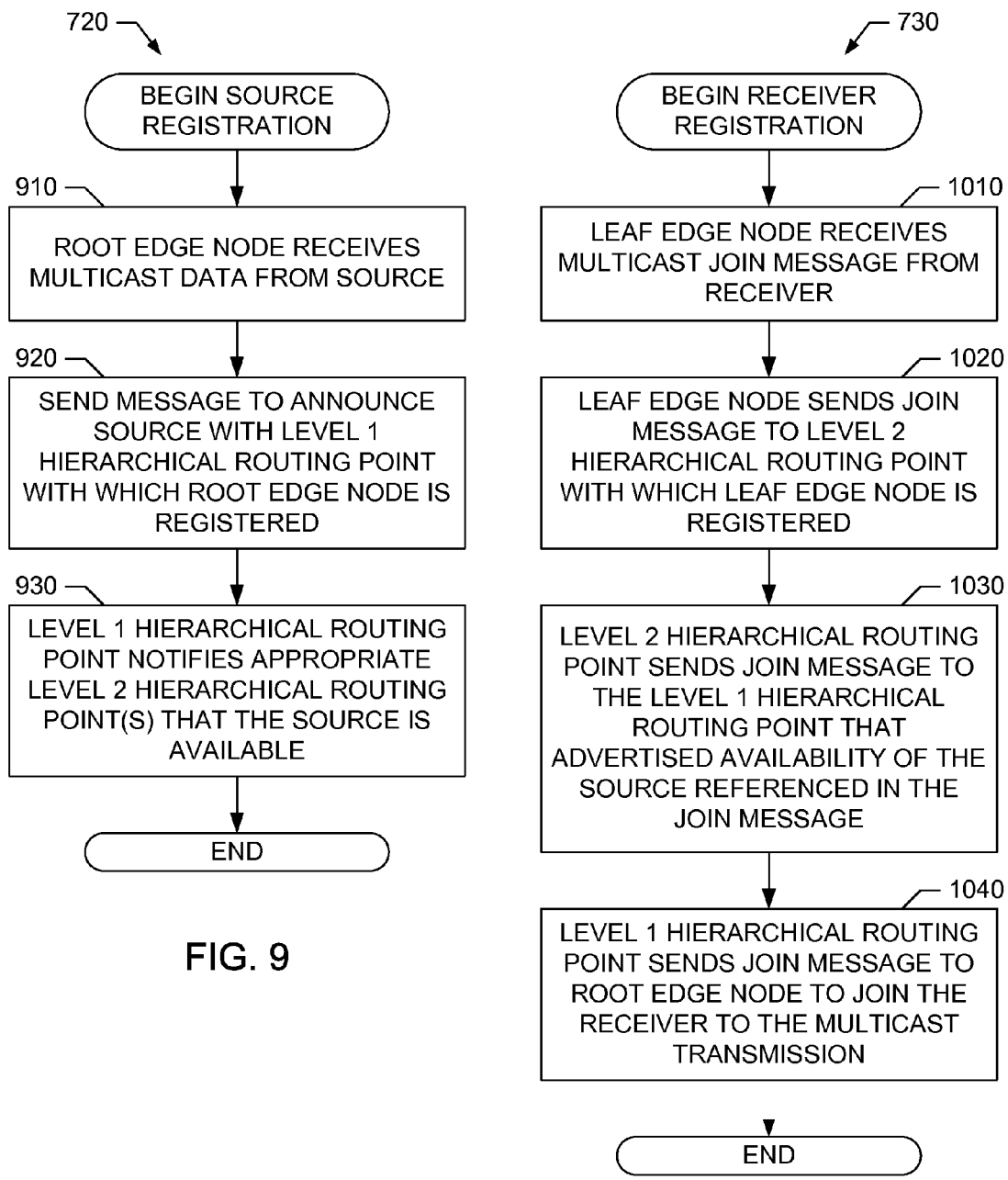

METHODS AND APPARATUS FOR NETWORK MULTICASTING USING HIERARCHICAL REPLICATION

RELATED APPLICATION(S)

This patent arises from a continuation of U.S. patent application Ser. No. 12/963,338 (now U.S. Pat. No. 9,148,362), which is entitled "METHODS AND APPARATUS FOR NETWORK MULTICASTING USING HIERARCHICAL REPLICATION," and which was filed on Dec. 8, 2010. U.S. patent application Ser. No. 12/963,338 is hereby incorporated by reference in its entirety. Priority to U.S. patent application Ser. No. 12/963,338 is claimed.

FIELD OF THE DISCLOSURE

This disclosure relates generally to data networks and, more particularly, to methods and apparatus for network multicasting using hierarchical replication.

BACKGROUND

In many service provider communication networks, edge nodes, such as provider edge (PE) routers, interface customer premises equipment (CPE) with the provider network. The edge nodes, in turn, directly or indirectly interface with the network node(s) implementing the provider network. Examples of such network nodes include area border routers (ABRs) that define the interfaces between the provider's core network and the edge segments of the provider network (e.g., containing the CPE and edge nodes), core routers implementing the core network, autonomous system boundary routers (ASBRs) interfacing different provider networks, etc.

Multicasting is a feature offered by many provider networks to enable multicast data from a single customer data source communicatively coupled to an edge node (referred to as a root edge node or root node) to be conveyed via the network node(s) implementing the provider network to multiple customer data receivers communicatively coupled to one or more other edge nodes (referred to as leaf edge nodes or leaf nodes). Prior techniques to perform multicasting generally involve the root edge node replicating copies of the multicast data for each leaf edge node, and/or the network node(s) maintaining state information for a multicast tree used to route the multicast data through the provider network from the root edge node to the various leaf edge node(s).

BRIEF DESCRIPTION OF THE DRAWINGS

FIG. 9 is a flowchart representative of example machine readable instructions that may be executed to implement at least portions of the hierarchical replication point of FIG. 5 and the edge node of FIG. 6 to implement source registration for hierarchical multicast data replication in the example network of FIG. 4.

FIG. 10 is a flowchart representative of example machine readable instructions that may be executed to implement at least portions of the hierarchical replication point of FIG. 5 and the edge node of FIG. 6 to implement receiver registration for hierarchical multicast data replication in the example network of FIG. 4.

DETAILED DESCRIPTION

Methods and apparatus for network multicasting using hierarchical replication are disclosed herein. An example method to send multicast data associated with a data source to multiple data receivers in a network includes receiving the multicast data at a root edge node and sending the multicast data via a first unicast path to a first network node associated with a first hierarchical level of a replication hierarchy. The example method also includes replicating the multicast data received at the first network node via the first unicast path, and sending copies of the multicast data via unicast paths to a group of network nodes associated with a second hierarchical level of the replication hierarchy. The example method further includes receiving a copy of the multicast data at a second network node, which is in the group of network nodes associated with the second hierarchical level, and replicating the received copy of the multicast data for sending to a leaf edge node communicatively coupled to a receiver that is to receive the multicast data. Additionally, in some examples, the method includes procedures for: (i) registering the root edge node with the first network node associated with the first hierarchical level of the replication hierarchy; (ii) registering the leaf edge node with the second network node associated with the second hierarchical level of the replication hierarchy; (iii) signaling to the first and second network nodes that the source is available; (iv) joining the receiver communicatively coupled with the leaf edge node to a multicast transmission provided by the source to enable reception of the multicast data; etc.

Figure 1:
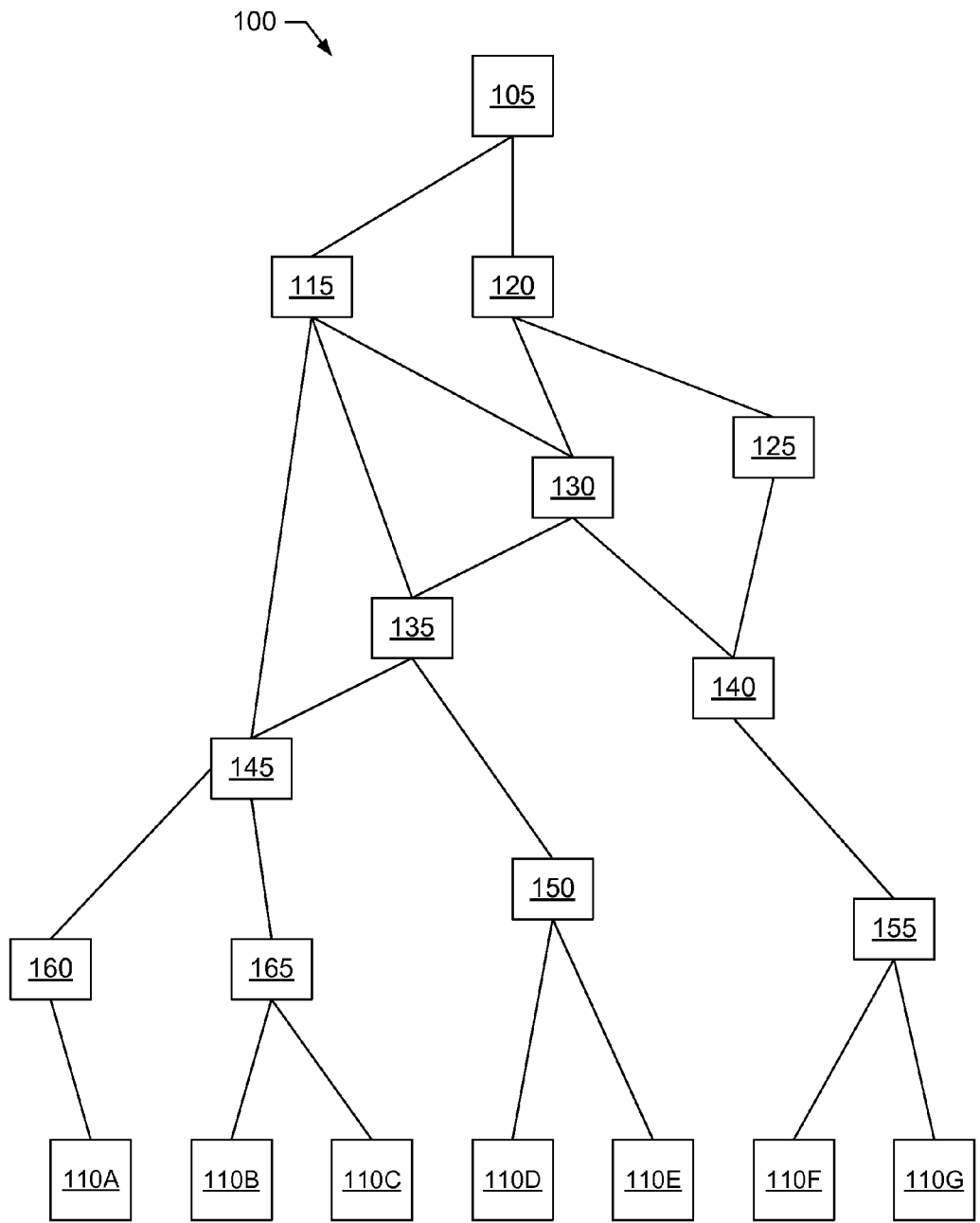
FIG. 1 is block diagram of an example network to send multicast data from an example root edge node to multiple example leaf edge nodes.

Turning to the figures, a block diagram of an example provider network 100 in which multicast data can be sent from an example edge node 105 to multiple example edge nodes 110A-G is illustrated in FIG. 1. The provider network 100 can be implemented to provide any type of networking service, such as an Internet service, a virtual private local area network (LAN) service (VPLS), a virtual private network (VPN) service, etc. The edge nodes 105 and 110A-G can be implemented by any type of networking nodes capable of communicatively coupling, for example, CPE and/or any other types of communication devices (not shown), to the provider network 100. Also, one or more of the edge nodes 105 and 110A-G could be implemented by the example processing system 1200 illustrated in FIG. 12, which is described in greater detail below. In some examples, the edge nodes 105 and 110A-G can correspond to one or more PE routers.

The provider network 100 also includes network nodes 115, 120, 125, 130, 135, 140, 145, 150, 155, 160 and 165, collectively referred to as network nodes 115-165, to communicatively couple the edge node 105 with the edge nodes 110A-G in accordance with the illustrated example network topology. The network nodes 115-165 can correspond to, for example, one or more ABRs to interface between a core network and edge segment(s) of the provider network 100, one or more core routers implementing the core network, one or more ASBRs interfacing the provider network 100 with other provider networks, etc. Also, one or more of the network nodes 115-165 could be implemented by the example processing system 1200 illustrated in FIG. 12, which is described in greater detail below.

In the illustrated example, the edge node 105 is to communicatively couple a multicast data source (not shown) with the provider network 100. Accordingly, the edge node 105 is referred to herein as root edge node 105 (because this node is the root in the network 100 at which the multicast data originates). Additionally, each of the edge nodes 110A-G is to communicatively couple with zero, one or more data receivers that are to receive multicast data sent by the multicast data source. Accordingly, the edge nodes 110A-G are referred to herein as leaf edge nodes 110A-G. Although the edge node 105 is referred to as a root edge node and the edge nodes 110A-G are referred to as leaf edge nodes, a particular edge node 105, 110A-G can be a root edge node, a leaf edge node, or both a root edge node and a leaf edge node depending upon whether the communication device(s) communicatively coupled to the edge node are sending data, receiving data, or performing a combination of sending and receiving data.

Figure 2:
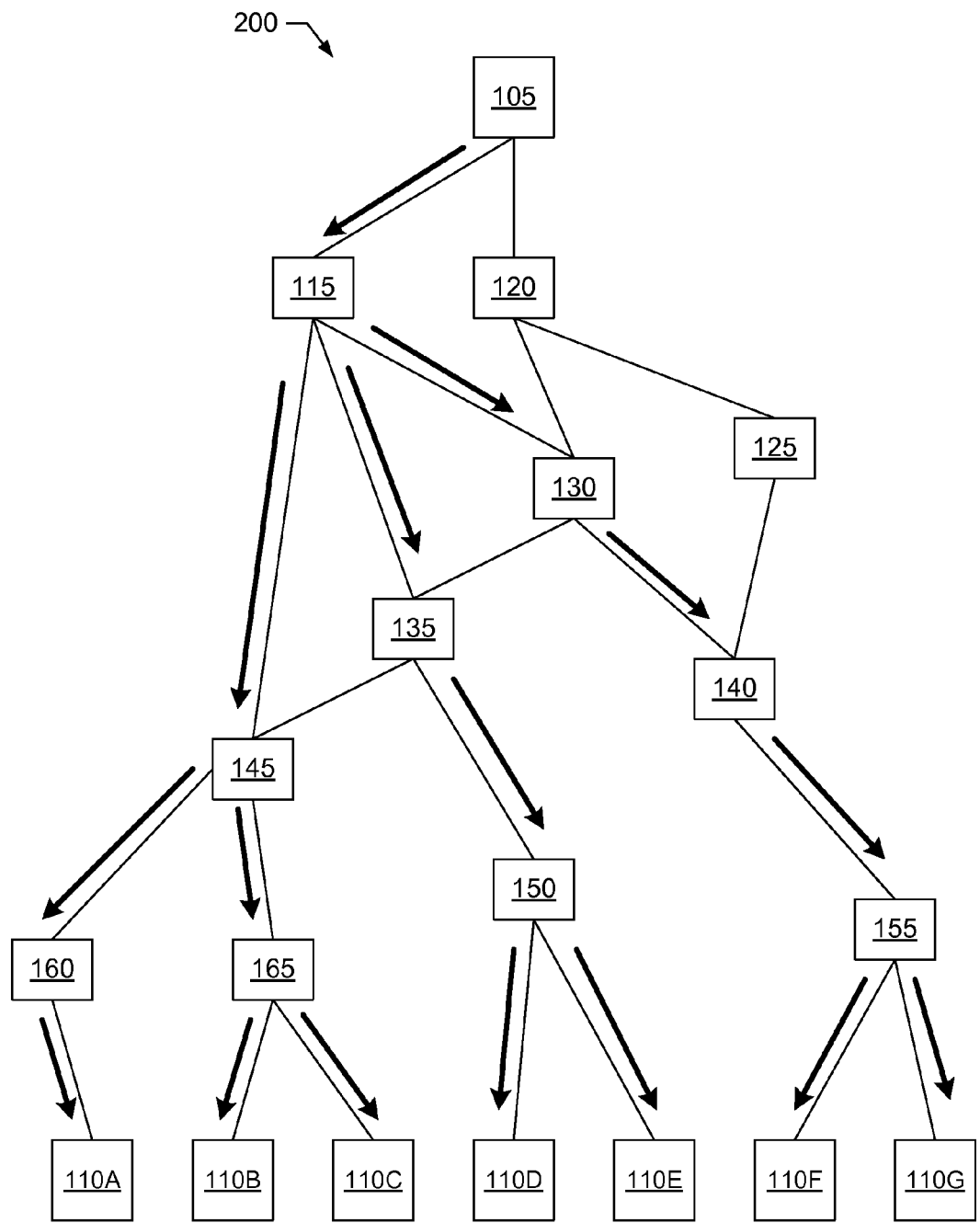
FIG. 2 is a block diagram of the example network of FIG. 1 in which a prior art multicast tree is used to send the multicast data from the root edge node to the leaf edge nodes.

FIG. 2 illustrates an example network 200 having the same network topology as the network 100 of FIG. 1 and in which a prior art multicast tree is to be used for multicast data routing. Like elements in FIGS. 1-2 are labeled with the same reference numerals. In the illustrated example of FIG. 2, a multicast tree (represented by directed lines in FIG. 2) is established (e.g., through provisioning by the service provider and exchanging of protocol independent multicast (PIM) messages by the network nodes) to route multicast data from the root edge node 105 to the leaf edge nodes 110A-G. (Although not shown, the multicast data source is located behind the root edge node 105, and the multicast data receivers are located behind one or more of the leaf edge nodes 110A-G.) To establish the multicast tree, multicast routing state information is received, stored and maintained at each network node 115, 130, 35, 140, 145, 150, 155, 160 and 165 along the multicast paths from the root edge node 105 to the leaf edge node(s) 110A-G that are to receive the multicast data. In the illustrated example, after the multicast tree is established, the multicast data source communicatively coupled to the root edge node 105 can send multicast data, and receivers communicatively coupled to the leaf edge node(s) 110A-G can join the multicast transmission provided by the multicast data source using, for example, protocol independent multicast (PIM) procedures. Then, in the illustrated example, one copy of each multicast data packet is sent on each branch of the multicast tree (e.g., where each branch is represented by a directed line in FIG. 2).

Figure 3:
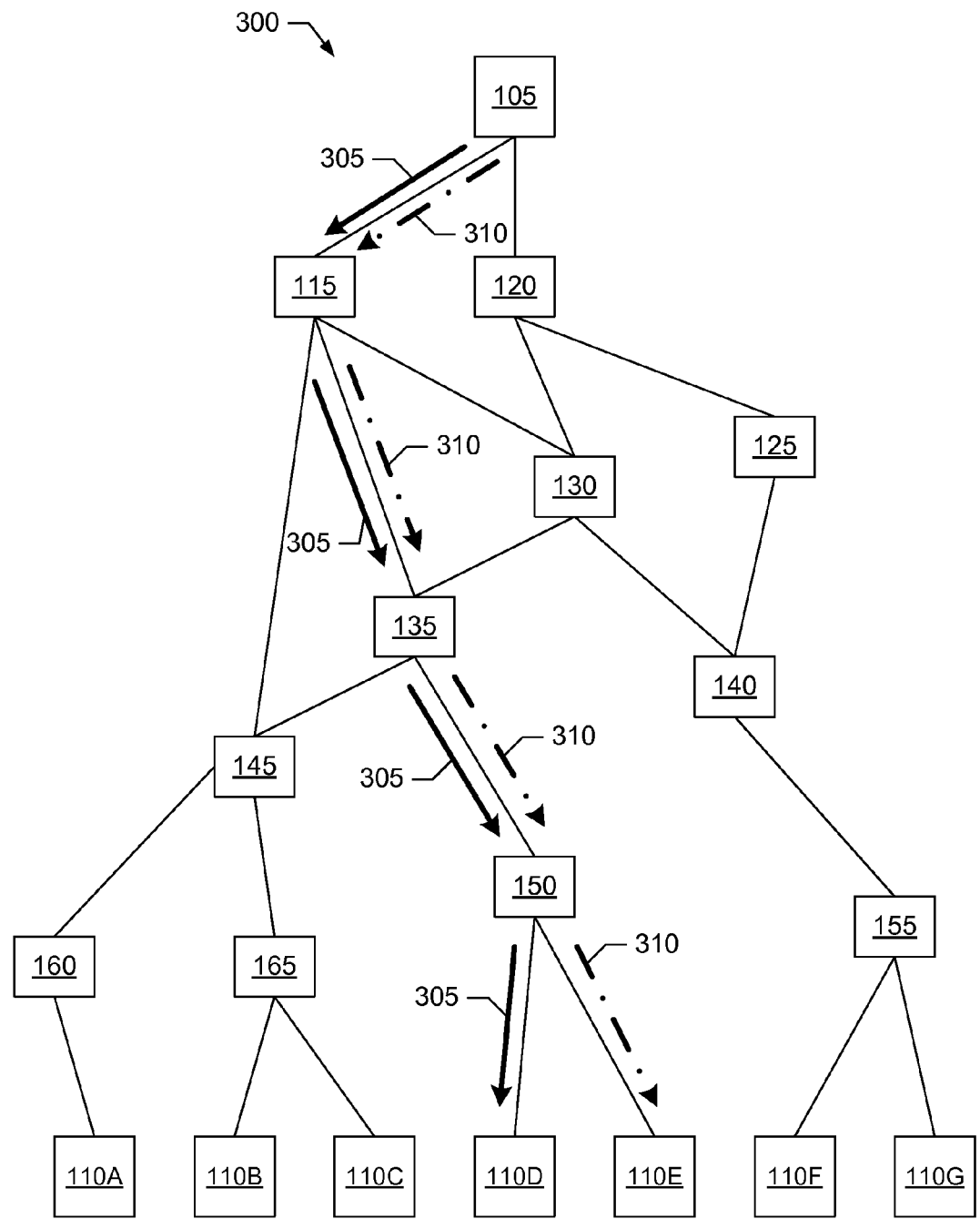
FIG. 3 is a block diagram of the example network of FIG. 1 in which prior art ingress replication is used to send the multicast data from the root edge node to the leaf edge nodes.

FIG. 3 illustrates an example network 300 having the same network topology as the network 100 of FIG. 1 and in which a prior art ingress replication technique is to be used for multicast data routing. Like elements in FIGS. 1-3 are labeled with the same reference numerals. In the illustrated example of FIG. 3, ingress replication is used to route multicast data from the root edge node 105 to the leaf edge nodes 110A-G. (As in the examples of FIGS. 1-2, the multicast data source is located behind the root edge node 105, and the multicast data receivers are located behind one or more of the leaf edge nodes 110A-G.) To perform ingress replication in the illustrated example, the root edge node 105 sends separate copies of the multicast data (e.g., separate copies of each multicast data packet) to each of the leaf edge nodes 110A-G that is to receive the multicast data. Unicast (also referred to as point-to-point) label switched paths (LSPs) are used to send the copies of the multicast data from the root edge node 105 to each respective leaf edge node 110A-G.

Figure 4:
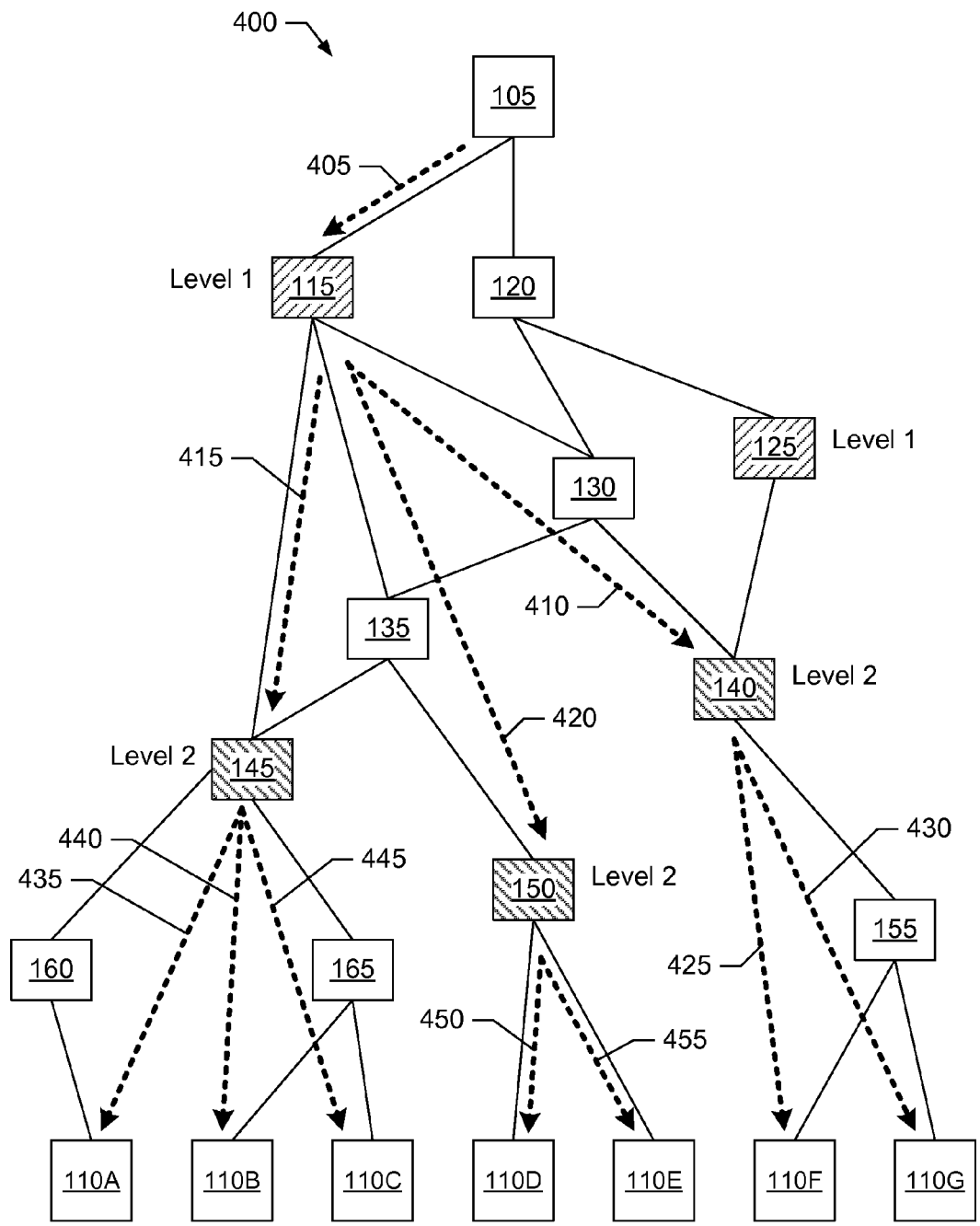
FIG. 4 is a block diagram of the example network of FIG. 1 in which hierarchical replication as disclosed herein is used to send the multicast data from the root edge node to the leaf edge nodes.

For example, in the network 300, the root edge node 105 is to send multicast data from a multicast data source (not shown) to the leaf edge nodes 110D-E for receipt by multicast data receivers (not shown) that are communicatively coupled to these leaf edge nodes. To send the multicast data, the root edge node 105 performs ingress replication to send a first copy of the multicast data along a first unicast LSP 305 to the leaf edge node 110D, and a second copy of the multicast data along a second unicast LSP 310 to the leaf edge node 110E. As such, multiple copies of the same multicast data may be sent on the same physical link, but in different LSPs. As illustrated in the example of FIG. 2, to perform ingress replication the root edge node 105 has to create as many copies of the multicast data as there are leaf edge nodes 110A-G that are to receive the multicast data FIG. 4 illustrates an example network 400 having the same network topology as the network 100 of FIG. 1 and in which hierarchical replication as disclosed herein is to be used for multicast data routing. Like elements in FIGS. 1-4 are labeled with the same reference numerals. As illustrated in the example network 400 of FIG. 4, multicasting using hierarchical replication (also referred to as hierarchical multicast data replication) involves sending multicast data from the root edge node 105 to the leaf edge nodes 110A-G through a hierarchical arrangement of network nodes 115, 125, 140, 145 and 150 configured to perform data replication. (As in the examples of FIGS. 1-3, the multicast data source is located behind the root edge node 105, and the multicast data receivers are located behind one or more of the leaf edge nodes 110A-G.) Accordingly, in the context of FIG. 4, the network nodes 115, 125, 140, 145 and 150 are referred to as hierarchical replication points (HRPs) or, alternatively, as network replication points (NRPs). Each HRP 115, 125, 140, 145 and 150 replicates multicast data received at the HRP and sends the replicated multicast data to one or more HRPs at the next level in the multicast replication hierarchy, or to one or more of the leaf edge nodes 110A-G.

For example, the multicast replication hierarchy in the network 400 includes two hierarchical levels. The first hierarchical level (also referred to as the first level or level 1) includes the HRPs 115 and 125. The second hierarchical level (also referred to as the second level or level 2) includes HRPs 140, 145 and 150. In general, the root edge node 105 replicates received multicast data to one or more of the first level HRPs 115 and 125 which, in turn, replicate their received multicast data to one or more of the second level HRPs 140, 145 and 150 which, in turn, replicate their received multicast data to the leaf edge nodes 110A-G. FIG. 4 illustrates an example of this hierarchical replication, in which the root edge node 105 sends one copy of the multicast data to the first level HRP 115. The first level HRP 115 then sends three copies of the received multicast data to the second level HRPs 140, 145 and 155. Then, the second level HRP 140 sends two copies of the multicast data to the leaf nodes 110E-G, the second level HRP 145 sends three copies of the multicast data to the leaf nodes 110A-C, and the second level HRP 150 sends two copies of the multicast data to the leaf nodes 110D-E.

Unlike the multicast tree illustrated in the example network 200 of FIG. 2, hierarchical multicast data replication as illustrated in the example network 400 of FIG. 4 employs unicast LSPs (or any other type of unicast path) to route the multicast data through the network 400. For example, an example unicast LSP 405 is used to convey the multicast data from the root edge node 105 to the first level HRP 115. Example unicast LSPs 410, 415 and 420 are used to convey copies of the multicast data to the second level HRPs 140, 145 and 150, respectively. Example unicast LSPs 425 and 430 are used to convey copies of the multicast data from the second level HRP 140 to the leaf edge nodes 110E-G. Example unicast LSPs 435, 440 and 445 are used to convey copies of the multicast data from the second level HRP 145 to the leaf edge nodes 110A-C. Example unicast LSPs 450 and 455 are used to convey copies of the multicast data from the second level HRP 150 to the leaf edge nodes 110D-E.

Furthermore, unlike ingress replication as illustrated in the example network 300 of FIG. 3, the root edge node 105 in the example network 400 of FIG. 4 does not need to generate all of the copies of the multicast data to be sent to the leaf edge nodes 110A-G. Instead, hierarchical multicast data replication as illustrated in the example network 400 allows data replication to be distributed in the network 400 (e.g., at multiple hierarchical levels), thereby reducing the burden of data replication imposed on any single node in the network 400. In contrast, ingress replication can result in a significant processing burden on the root edge node to perform the data replication, especially if the number of leaf edge nodes is large.

Figure 5:
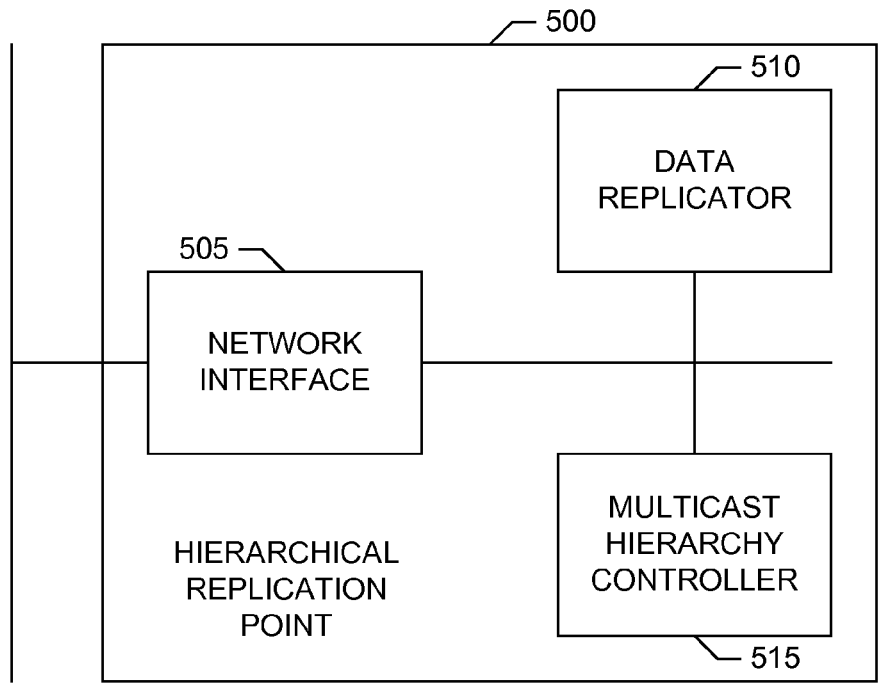
FIG. 5 is a block diagram of an example hierarchical replication point that may be used to implement the example network of FIG. 4.
Figure 6:
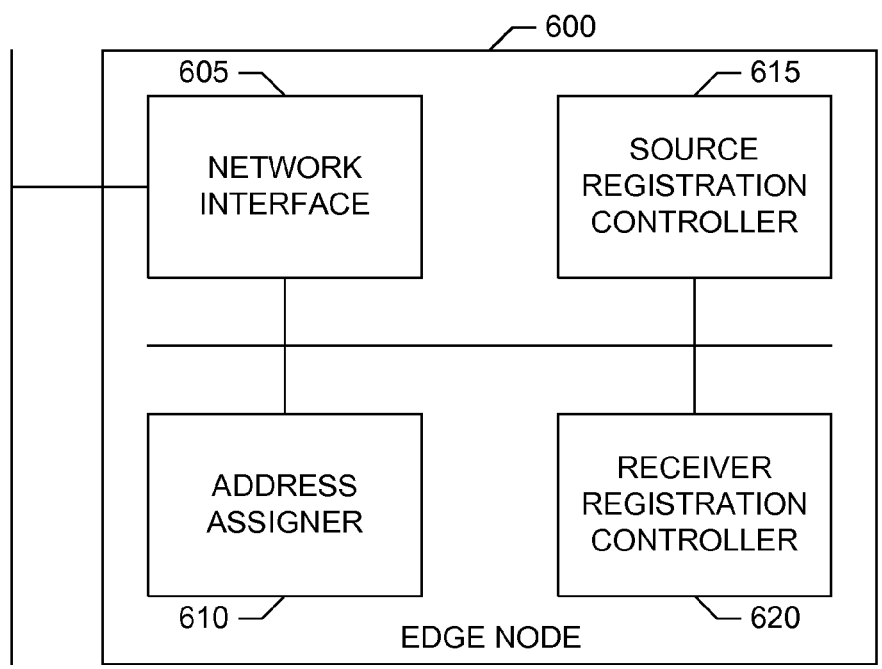
FIG. 6 is a block diagram of an example edge node that may be used to implement the example network of FIG. 4.

The hierarchical replication functionality included in an HRP (such as one of the HRPs 115, 125, 140, 145 and 150) can be implemented, for example, in the network node associated with the HRP, or as an adjunct device communicatively coupled to the network node. In the latter example, the received multicast data traverses from the network node to the adjunct replication device. The multicast data is replicated at the adjunct replication device, and then sent back to the network node for subsequent transmission to HRP(s) at the next level in the hierarchy, or to leaf edge node(s). In some examples, the HRPs are implemented by, or associated with, one or more ABRs or ASBRs in the network 400. An example implementation of an HRP that could be used to implement one or more of the HRPs 115, 125, 140, 145 and 150 is illustrated in FIG. 5. Also, an example implementation of one or more of the edge nodes 105 and/or 110A-G to support hierarchical multicast data replication is illustrated in FIG. 6.

In some examples, the multicast replication hierarchy in the example network 400 of FIG. 4, is established by assigning the same, first anycast address to each HRP 115 and 125 at the first level in the multicast replication hierarchy, and the same, second anycast address to each HRP 140, 145 and 150 at the second level in the multicast replication hierarchy. In some examples, one or more of the HRPs 115, 125, 140, 145 and/or 150 may be associated with both the first and second hierarchical levels of the multicast replication hierarchy. For example, one or more of the HRPs 115, 125, 140, 145 and/or 150 may be associated with the first hierarchical level of the multicast replication hierarchy for multicast data being sent in one direction, and the second hierarchical level for multicast data being sent in another direction. As such, these one or more HRPs 115, 125, 140, 145 and 150 may be assigned both the first anycast address (e.g., for use when the HRP is operating at the first hierarchical level) and the second anycast address (e.g., for use when the HRP is operating at the second hierarchical level).

In examples employing anycast addresses, the edge nodes 105 and 110A of the example network 400 use the anycast addresses to register with one of the HRPs at the first hierarchical level (e.g., one of the HRPs 115 and 125) to send multicast data, and/or register with one or the HRPs at the second hierarchical level (e.g., one of HRPs 140, 145 and 150) to receive multicast data. For example, the root edge node 105 can send a registration message addressed to the first anycast address associated with the first hierarchical level using, for example, the multicast source discovery protocol (MSDP). The provider network 400 routes this registration message to the nearest HRP assigned the first anycast address (e.g., in terms of topology distances based on, for example, link weights and other routing parameters, geographical distances, etc.), which in the illustrated example is HRP 115. The root edge node 105 then becomes registered with (e.g., a client of) the HRP 115 for sending multicast data. Similarly, a leaf edge node, such as the leaf edge node 110A, can send a registration message (e.g., a join message) addressed to the second anycast address associated with the second hierarchical level using, for example, messaging similar to protocol independent multicast-sparse mode (PIM-SM). The provider network 400 routes this registration message to the nearest HRP assigned the second anycast address (e.g., in terms of topology distances), which in the illustrated example is HRP 145. The leaf edge node 110A then becomes registered with (e.g., a client of) the HRP 145 for receiving multicast data.

By using anycast addresses, the edge nodes 105 and 110A-G need not know a particular address identifying a particular HRP at a particular hierarchical level. Moreover, in the event an HRP becomes unavailable, the use of anycast addresses enable the affected edge node(s) to re-register with a next nearest HRP by sending another registration message to the same anycast address.

In some examples, each of the HRPs 115, 125, 140, 145 and/or 150 also has a unique address (e.g., a unique Internet protocol (IP) address) that enables communication between the HRPs, and the other network nodes 120, 130, 135, 155, 160 and 165. These unique addresses also enable multicast data to be routed from the root edge node 105 to the leaf edge node(s) along the multicast replication hierarchy. For example, a first level HRP (e.g., such as the HRP 115) may replicate multicast data to only those second level HRPs (e.g., such as one or more of the HRPs 140, 145 and 150) that are to route the multicast data to receiver(s) that have joined the multicast transmission. In other examples, a first level HRP (e.g., such as the HRP 115) may replicate multicast data to all second level HRPs (e.g., such as all of the HRPs 140, 145 and 150). In this latter example, the second level HRP(s) decide whether to route the multicast data to joined receiver(s), or drop (e.g., discard, ignore, etc.) the received multicast data if the second level HRP is not associated with any receiver(s) to which the multicast data is to be routed.

Although the example provider network 400 is illustrated as having an example multicast replication hierarchy with two hierarchical levels, the example methods and apparatus described herein can implement and support a multicast replication hierarchy with any number of hierarchical levels. Also, although FIG. 4 illustrates the example multicast replication hierarchy as being implemented in the example provider network 400, the example methods and apparatus described herein can implement and support multicast replication hierarchies in any type of provider network, customer network, other network, or combination thereof.

An example HRP 500 that could be used to implement one or more of the HRPs 115, 125, 140, 145 and 150 to perform hierarchical multicast data replication in, for example, the provider network 400 of FIG. 4 is illustrated in FIG. 5. As described above, the example HRP 500 can be implemented by a network node, by an adjunct device associated with a network node, or any combination thereof. Accordingly, FIG. 5 illustrates elements that implement hierarchical multicast data replication, whereas elements implementing other network node functionality are omitted for clarity.

The HRP 500 of the illustrated example includes an example network interface 505 to interface with a network, such as the provider network 400, to send and receive messages, send and receive data, such as multicast data, etc. The network interface 505 can be implemented using any type of data interface. For example, the network interface 505 could be implemented by the interface circuit 1224 included in the example processing system 1200 of FIG. 12, which is described in greater detail below.

The HRP 500 of FIG. 5 also includes an example data replicator 510 to receive and replicate multicast data. For example, the data replicator 510 can: (i) receive multicast data (e.g., via the network interface 505) from, for example, a root edge node (such as the root edge node 105) or from an HRP at a preceding hierarchical level (such as the HRP 115); (ii) replicate the received multicast data; (iii) send the replicated multicast data (e.g., via the network interface 505) to, for example, one or more HRPs at a next hierarchical level (such as one or more of the HRPs 140, 145 and/or 150), or one or more leaf edge nodes (such as one or more of the leaf edge nodes 110A-G), etc.

The HRP 500 of FIG. 5 further includes an example multicast hierarchy controller 515. In some examples, the multicast hierarchy controller 515 accepts anycast address assignments for the HRP 500 and registers edge nodes as clients of the HRP 500 for sending and/or receiving multicast data. In some examples, the multicast hierarchy controller 515 also determines: (i) whether to discard received multicast data or accept multicast data for replication; (ii) how many copies of the received multicast data are to be replicated; (iii) to which destinations the replicated multicast data is to be sent, etc. Example operation of the HRP 500, the network interface 505, the data replicator 510 and the hierarchy controller 515 is further described below.

An example edge node 600 that could be used to implement one or more of the edge nodes 105 and/or 110A-G to support hierarchical multicast data replication in, for example, the provider network 400 is illustrated in FIG. 6. For clarity, FIG. 6 illustrates elements that implement hierarchical multicast data replication, whereas elements implementing other edge node functionality are omitted. The edge node 600 of the illustrated example includes an example network interface 605 to interface with a network, such as the provider network 400, to send and receive messages, send and receive data, such as multicast data, etc. The network interface 605 can be implemented using any type of data interface. For example, the network interface 605 could be implemented by the interface circuit 1224 included in the example processing system 1200 of FIG. 12, which is described in greater detail below.

The example edge node 600 of FIG. 6 also includes an address assigner 610 to accept anycast addresses to be used to register with HRPs for sending multicast data and/or receiving multicast data. For example, the edge node 600 includes an example source registration controller 615 that uses a first anycast address associated with a first level of the multicast replication hierarchy to send message(s) to register with an HRP (such as the HRP 115) to which multicast data is to be sent. In some examples, the source registration controller 615 also sends message(s) to announce availability of a source of multicast data that is accessible via the edge node 600.

Additionally or alternatively, the example edge node 600 includes an example receiver registration controller 620 that uses a second anycast address associated with a second level of the multicast replication hierarchy to send message(s) to register with an HRP (such as one of the HRPs 140, 145 and/or 150) from which multicast data is to be received. In some examples, the receiver registration controller 620 also sends message(s) to join receiver(s) communicatively coupled with the edge node 600 to multicast transmission(s) (also referred to as multicast sessions) provides by sources that have been announced as being available. Example operation of the edge node 600, the network interface 605, the address assigner 610, the source registration controller 615 and the receiver registration controller 620 is further described below.

While an example manner of implementing one or more of the HRPs 115, 125, 140, 145 and/or 150 of FIG. 4 has been illustrated by the example HRP 500 in FIG. 5, and an example manner of implementing one or more of the edge nodes 105 and/or 110A-G has been illustrated by the example edge node 600 of FIG. 6, one or more of the elements, processes and/or devices illustrated in FIGS. 5 and/or 6 may be combined, divided, re-arranged, omitted, eliminated and/or implemented in any other way. Further, the example network interface 505, the example data replicator 510, the example hierarchy controller 515, the example network interface 605, the example address assigner 610, the example source registration controller 615, the example receiver registration controller 620 and/or, more generally, the example HRP 500 and/or the example edge node 600 of FIGS. 5-6 may be implemented by hardware, software, firmware and/or any combination of hardware, software and/or firmware. Thus, for example, any of the example network interface 505, the example data replicator 510, the example hierarchy controller 515, the example network interface 605, the example address assigner 610, the example source registration controller 615, the example receiver registration controller 620 and/or, more generally, the example HRP 500 and/or the example edge node 600 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example HRP 500, the example edge node 600, the example network interface 505, the example data replicator 510, the example hierarchy controller 515, the example network interface 605, the example address assigner 610, the example source registration controller 615 and/or the example receiver registration controller 620 are hereby expressly defined to include a tangible computer readable medium such as a memory, digital versatile disk (DVD), compact disk (CD), etc., storing such software and/or firmware. Further still, the example HRP 500 and/or the example edge node 600 of FIGS. 5-6 may include one or more elements, processes and/or devices in addition to, or instead of, those illustrated in FIGS. 5-6, and/or may include more than one of any or all of the illustrated elements, processes and devices.

Flowcharts representative of example machine readable instructions that may be executed to implement the example edge nodes 105 and/or 110A-G, the example HRPs 115, 125, 140, 145 and/or 150, the example HRP 500, the example network interface 505, the example data replicator 510, the example hierarchy controller 515, the example edge node 600, the example network interface 605, the example address assigner 610, the example source registration controller 615 and/or the example receiver registration controller 620 are shown in FIGS. 7-11. In these examples, the machine readable instructions represented by each flowchart may comprise one or more programs for execution by a processor, such as the processor 1212 shown in the example processing system 1200 discussed below in connection with FIG. 12. Alternatively, the entire program or programs and/or portions thereof implementing one or more of the processes represented by the flowcharts of FIGS. 7-11 could be executed by a device other than the processor 1212 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 7-11 may be implemented manually. Further, although the example machine readable instructions are described with reference to the flowcharts illustrated in FIGS. 7-11, many other techniques for implementing the example methods and apparatus described herein may alternatively be used. For example, with reference to the flowcharts illustrated in FIGS. 7-11, the order of execution of the blocks may be changed, and/or some of the blocks described may be changed, eliminated, combined and/or subdivided into multiple blocks.

As mentioned above, the example processes of FIGS. 7-11 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-11 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 7:
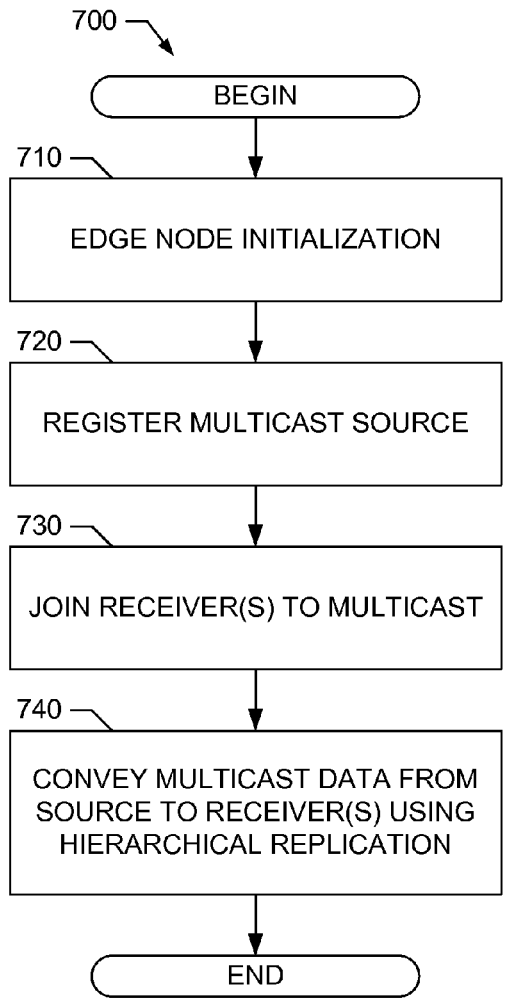
FIG. 7 is a flowchart representative of example machine readable instructions that may be executed to implement at least portions of the hierarchical replication point of FIG. 5 and the edge node of FIG. 6 to implement hierarchical multicast data replication in the example network of FIG. 4.
Figure 8:
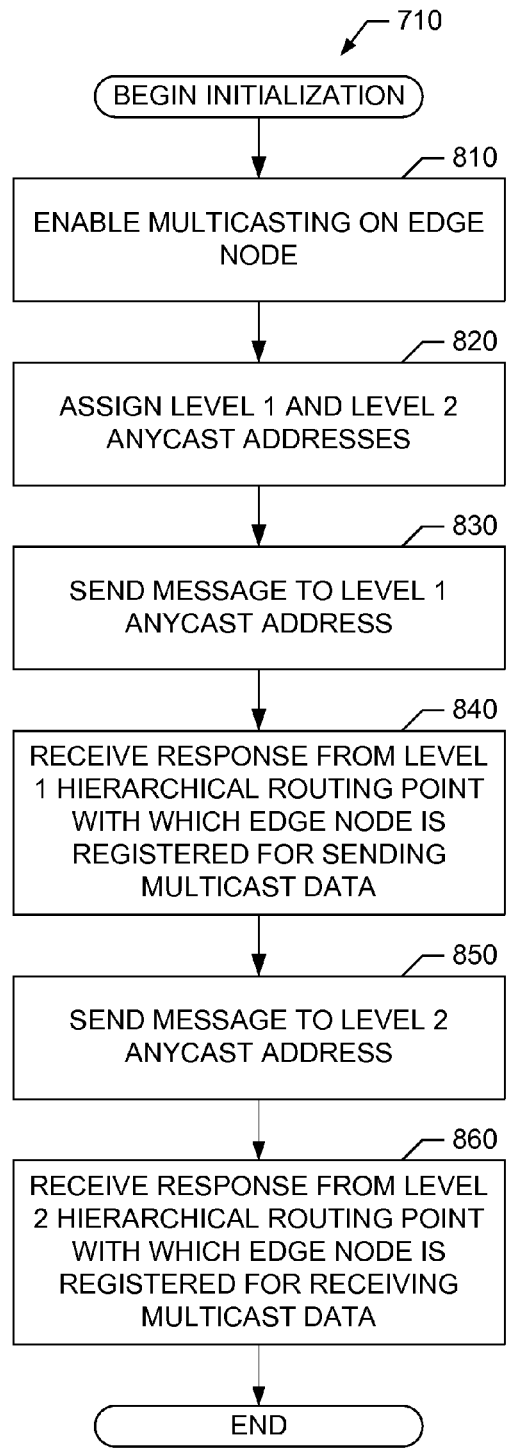
FIG. 8 is a flowchart representative of example machine readable instructions that may be executed to initialize the edge node of FIG. 6.

Example machine readable instructions 700 that may be executed to implement multicasting using hierarchical replication in the example provider network 400 of FIG. 4 are illustrated in FIG. 7. With reference to the preceding figures, the machine readable instructions 700 of FIG. 7 begin execution at block 710 at which the edge nodes 105 and 110A-G perform an initialization procedure to register with one or more of the HRPs 115, 125, 140, 145 and/or 150 for sending and/or receiving multicast data. Example machine readable instructions that may be used to perform the processing at block 710 are illustrated in FIG. 8, which is described in greater detail below.

Next, at block 720 the root edge node 105 registers a multicast source with the HRP 115 which, in turn, announces the availability of the multicast source the second level HRPs and leaf edge nodes 110A-G in the network 400. Example machine readable instructions that may be used to perform the processing at block 720 are illustrated in FIG. 9, which is described in greater detail below.

Next, at block 730, one or more of the leaf edge nodes 110A-G join one or more multicast receivers to the multicast transmission provided by the multicast source announced at block 710. For example, at block 730 the leaf edge node(s) 110A-G send join message(s) to their respective second-level HRPs 140, 145 and 150 to join the multicast receiver(s) to the multicast transmission. These join message(s) are routed up the multicast replication hierarchy to the root edge node 105 which, in turn, joins the receiver(s) to the multicast source. Example machine readable instructions that may be used to perform the processing at block 730 are illustrated in FIG. 10, which is described in greater detail below.

Figure 11:
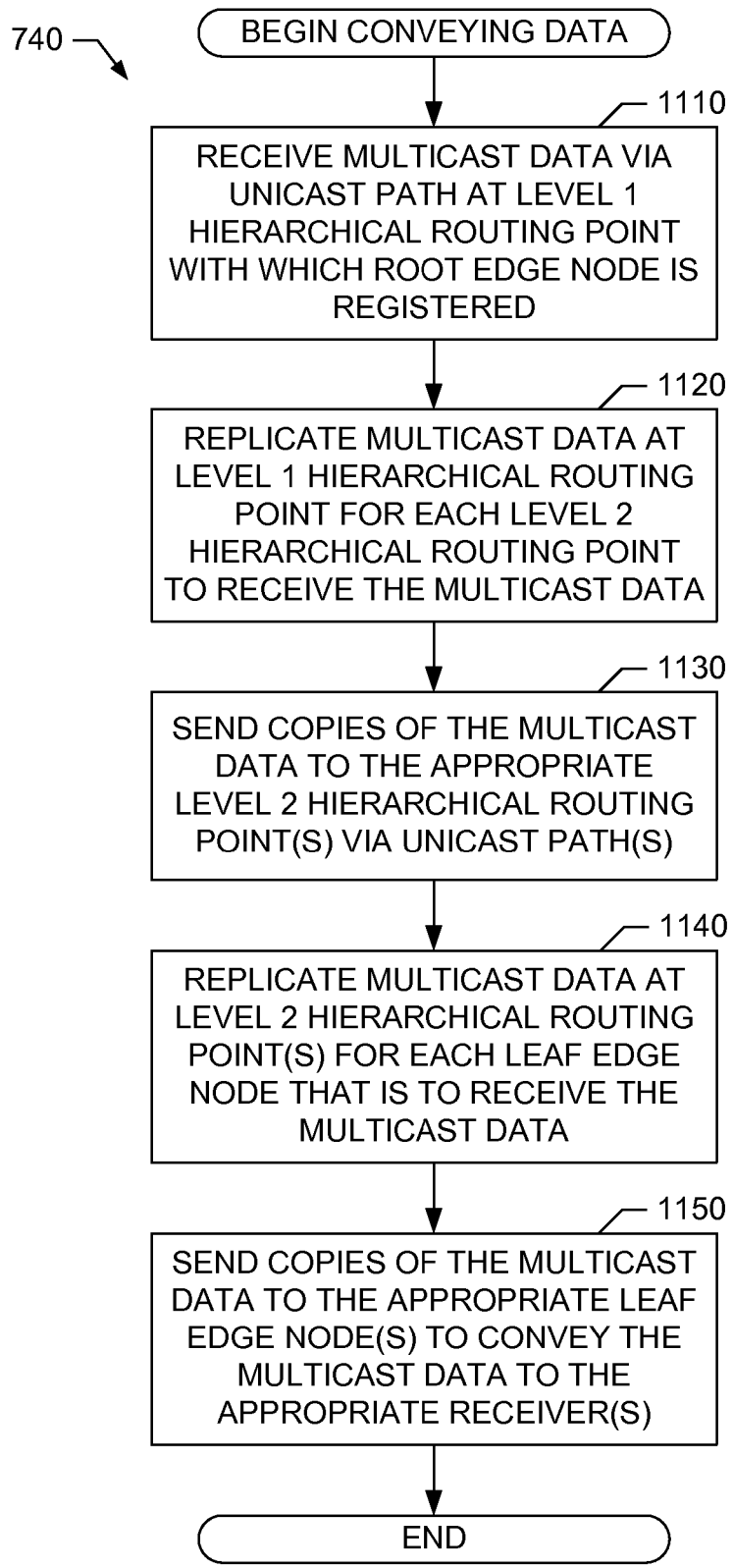
FIG. 11 is a flowchart representative of example machine readable instructions that may be executed to implement at least portions of the hierarchical replication point of FIG. 5 to convey multicast data using hierarchical replication in the example network of FIG. 4.

Next, at block 740 multicast data from the multicast source announced at block 720 is conveyed, using hierarchical multicast data replication, from the root edge node 105 to the leaf edge node(s) 110A-G for receipt by the multicast receiver(s) joined at block 740. Example machine readable instructions that may be used to perform the processing at block 740 are illustrated in FIG. 11, which is described in greater detail below.

Example machine readable instructions 710 that may be used to perform edge node initialization at block 710 of FIG. 7 are illustrated in FIG. 8. With reference to the preceding figures, the machine readable instructions 710 of FIG. 8 begin execution at block 810 at which multicasting is enabled (e.g., by the service provider) on the edge node 600, which may implement one or more of the edge nodes 105 and 110A-G. At block 820, the address assigner 610 of the edge node 600 is assigned a first level anycast address associated with a first level of multicast replication hierarchy (e.g., if the edge node 600 is configured to send multicast data). Additionally or alternatively, at block 820 the address assigner 610 is assigned a second level anycast address associated with a second level of multicast replication hierarchy (e.g., if the edge node 600 is configured to receive multicast data).

At block 830, the source registration controller 615 of the edge node 615 sends a registration message (e.g., using MSDP) addressed to the first anycast address (assigned at block 820) to register the edge node 615 with a first level HRP (e.g., such as the HRP 115) for sending multicast data. The registration message is routed by the network 400 to the nearest first level HRP assigned the first anycast address, as described above. At block 840, the source registration controller 615 receives a response from the first level HRP (e.g., such as the HRP 115) to which the registration message was routed, indicating that the edge node 600 is registered as a client with this particular first level HRP for purposes of sending multicast data.

At block 850, the receiver registration controller 620 of the edge node 615 sends a registration message (e.g., using messaging similar to PIM-SM) addressed to the second anycast address (assigned at block 820) to register the edge node 615 with a second level HRP (e.g., such as one of the HRPs 140, 145 or 150) for receiving multicast data. The registration message is routed by the network 400 to the nearest second level HRP assigned the second anycast address, as described above. At block 860, the receiver registration controller 620 receives a response from the second level HRP (e.g., such as one of the HRPs 140, 145 or 150) to which the registration message was routed, indicating that the edge node 600 is registered as a client with this particular second level HRP for purposes of receiving multicast data.

Example machine readable instructions 720 that may be used to perform multicast source registration at block 720 of FIG. 7 are illustrated in FIG. 9. With reference to the preceding figures, the machine readable instructions 720 of FIG. 9 begin execution at block 910 at which the edge node 600 (e.g., implementing the root edge node 105) receives multicast data from a multicast source communicatively coupled to the edge node. At block 920, the source registration controller 615 of the edge node 600 sends a message to its first level HRP (e.g., such as the HRP 115) to announce that this source is available. At block 930, this first level HRP (e.g., the HRP 115) sends notifications to one or more of the second level HRPs (e.g., the HRPs 140, 145 and/or 150) to announce the availability of the multicast source, which in turn can announce the availability of the multicast source to their respective registered leaf edge nodes (e.g., such as the one or more of the leaf edge nodes 110A-G).

Example machine readable instructions 730 that may be used to perform multicast receiver join processing at block 730 of FIG. 7 are illustrated in FIG. 10. With reference to the preceding figures, the machine readable instructions 730 of FIG. 10 begin execution at block 1010 at which the edge node 600 (e.g., implementing one or more of the leaf edge nodes 110A-G) receives a multicast join message from a multicast receiver communicatively coupled to the edge node 600. The join message indicates that the multicast receiver is requesting to join a multicast transmission offered by an available multicast source.

At block 1020, the edge node 600 sends the join message to its second level HRP (e.g., such as one of the HRPs 140, 145 or 150). At block 1030, this second level HRP sends the join message to the first level HRP (e.g., such as the HRP 115) that announced the availability of the multicast source referenced by the join message. At block 1040, this first level HRP sends the join message to the root edge node (e.g., the root edge node 105) registered with this first level HRP and communicatively coupled to the multicast source to join the multicast receiver with the multicast transmission offered by the multicast source.

Example machine readable instructions 740 that may be used to convey multicast data using hierarchical replication at block 740 of FIG. 7 are illustrated in FIG. 11. With reference to the preceding figures, the machine readable instructions 740 of FIG. 11 begin execution at block 1110 at which the first level HRP 115 (e.g., implemented by an instance of the HRP 500 of FIG. 5) receives multicast data via the unicast LSP from 405 from the root edge node 105 communicatively coupled with the multicast source. As described above, the root edge node 105 would have previously registered with the HRP 115 to be its first level HRP for sending multicast data.

Next, at block 1120 the data replicator 510 of the HRP 115 replicates the received multicast data to generate copies of the multicast data to send to one or more of the second level HRPs 140, 145 and/or 150. The multicast hierarchy controller 515 of the HRP 115 determines the number of copies to be generated and the second level HRPs to which the copies of the multicast data are to be sent. In some examples, the HRP 115 is to send copies of the multicast data to only those second level HRPs 140, 145 and/or 150 from which a join message associated with this multicast data (e.g., a join message from a multicast receiver requesting to join this particular multicast data transmission) was previously received. In other examples, the HRP 115 is to send copies of the multicast data to all the second level HRPs 140, 145 and/or 150. In this latter example, a second level HRP that has not received a join message associated with this multicast data can discard its copy of the multicast data because none of the leaf edge node(s) registered with this second level HRP have a multicast receiver to which the multicast data is to be routed.

At block 1130, the first level HRP 115 sends copies of the multicast data to the appropriate second level HRPs 140, 145 and/or 150 via the unicast LSPs 410, 415 and 420. (In the example of FIG. 11, each of the HRPs 140, 145 and 150 is assumed to be implemented by a separate instance of the HRP 500 of FIG. 5.) Next, at block 1140 each second level HRP 140, 145 and/or 150 that received a copy of the multicast data replicates the multicast data (e.g., via its respective data replicator 510) to create a copy of the multicast data for each of its leaf nodes 110A-G. Then, at block 1150 these second level HRPs 140, 145 and/or 150 send copies of the multicast data via unicast LSPs to their respective leaf nodes 110A-G, which in turn convey the multicast data to the multicast data receiver(s) that have joined this multicast data transmission. For example, at block 1150 the second level HRP 140 sends copies of the multicast data to the leaf edge nodes 110E-G via the unicast LSPs 435, 440 and 445, the second level HRP 145 sends copies of the multicast data to the leaf edge nodes 110A-C via the unicast LSPs 435, 440 and 445, and the second level HRP 150 sends copies of the multicast data to the leaf edge nodes 110D-E via the unicast LSPs 450 and 455.

Figure 12:
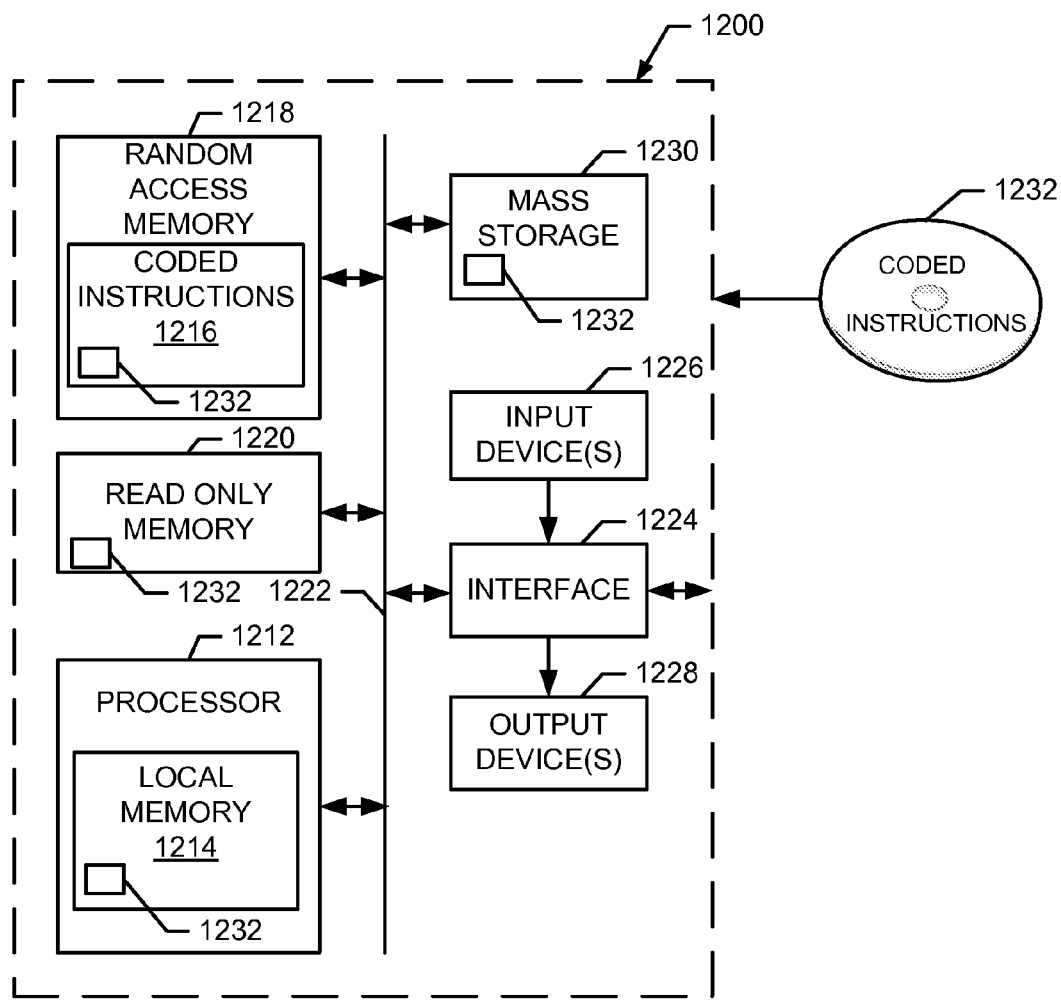
FIG. 12 is a block diagram of an example processing system that may execute the example machine readable instructions of FIGS. 7-10 and/or 11 to implement the example hierarchical replication point of FIG. 5, the example edge node of FIG. 6 and/or the example network of FIG. 4.

FIG. 12 is a block diagram of an example processing system 1200 capable of implementing the apparatus and methods disclosed herein. The processing system 1200 can be, for example, a server, a personal computer, a personal digital assistant (PDA), an Internet appliance, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, the machine readable instructions represented in FIGS. 7-11. The processor 1212 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown).

The processing system 1200 also includes an interface circuit 1224. The interface circuit 1224 may be implemented by any type of interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1200 also includes one or more mass storage devices 1230 for storing machine readable instructions and data. Examples of such mass storage devices 1230 include floppy disk drives, hard drive disks, compact disk drives and digital versatile disk (DVD) drives.

The coded instructions 1232 of FIGS. 7-11 may be stored in the mass storage device 1230, in the volatile memory 1218, in the non-volatile memory 1220, in the local memory 1214 and/or on a removable storage medium, such as a CD or DVD 1232.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for network multicasting, the method comprising:
registering, by executing an instruction with a processor associated with a first network node, a first leaf node to receive multicast data from a source via the first network node in response to receiving, from the first leaf node at the first network node, a first message addressed to an anycast address, the anycast addressed being assigned to the first network node to associate the first network node with a second hierarchical level of a replication hierarchy in a network;
receiving the multicast data at the first network node from a second network node associated with a first hierarchical level of the replication hierarchy, the multicast data received at the first network node via a unique network address of the first network node, the unique network address of the first network node being different from the anycast address assigned to the first network node; and
after registering the first leaf node with the first network node, replicating, by executing an instruction with the processor, the multicast data at the first network node to generate copies of the multicast data to be transmitted via respective unicast paths to respective ones of a plurality of leaf nodes, including the first leaf node, registered with the first network node to receive the multicast data.

2. The method of claim 1, further including sending a first one of the copies of the multicast data to the first leaf node via a first one of the unicast paths.

3. The method of claim 1, wherein the anycast address is assigned to a plurality of network nodes associated with the second hierarchical level of the replication hierarchy, the first network node included in the plurality of the network nodes.

4. The method of claim 3, wherein the multicast data received at the first network node is addressed to the unique network address of the first network node.

5. The method of claim 1, wherein the replication hierarchy includes a third hierarchical level in addition to the first hierarchical level and the second hierarchical level.

6. The method of claim 1, wherein the multicast data is first multicast data, and further including discarding second multicast data received at the first network node when no leaf node is registered with the first network node to receive the second multicast data.

7. The method of claim 1, wherein the source is a first source, the multicast data is first multicast data, the anycast address is a first anycast address, and further including receiving, at the first network node from a root node associated with a second source of second multicast data, a second message addressed to a second anycast address assigned to the first network node to register the root node with the first network node to permit sending of the second multicast data from the root node to the first network node, the second anycast address being different from the first anycast address.

8. A tangible computer readable medium including computer readable instructions which, when executed, cause a processor associated with a first network node to perform operations comprising:

registering a first leaf node to receive multicast data from a source via the first network node in response to receiving, from the first leaf node, a first message addressed to an anycast address, the anycast addressed being assigned to the first network node to associate the first network node with a second hierarchical level of a replication hierarchy in a network;

receiving the multicast data from a second network node associated with a first hierarchical level of the replication hierarchy, the multicast data received at the first network node via a unique network address of the first network node, the unique network address of the first network node being different from the anycast address assigned to the first network node; and after registering the first leaf node with the first network node, replicating the multicast data to generate copies of the multicast data to be transmitted via respective unicast paths to respective ones of a plurality of leaf nodes, including the first leaf node, registered with the first network node to receive the multicast data.

9. The tangible computer readable medium of claim 8, wherein the operations further include sending a first one of the copies of the multicast data to the first leaf node via a first one of the unicast paths.

10. The tangible computer readable medium of claim 8, wherein the anycast address is assigned to a plurality of network nodes associated with the second hierarchical level of the replication hierarchy, the first network node included in the plurality of the network nodes.

11. The tangible computer readable medium of claim 10, wherein the multicast data received at the first network node is addressed to the unique network address of the first network node.

12. The tangible computer readable medium of claim 8, wherein the replication hierarchy includes a third hierarchical level in addition to the first hierarchical level and the second hierarchical level.

13. The tangible computer readable medium of claim 8, wherein the multicast data is first multicast data, and the operations further include discarding second multicast data received at the first network node when no leaf node is registered with the first network node to receive the second multicast data.

14. A first network node comprising:

memory including computer readable instructions; and a processor to execute the computer readable instructions to perform operations including:

registering a first leaf node to receive multicast data from a source via the first network node in response to receiving, from the first leaf node, a first message addressed to an anycast address, the anycast addressed being assigned to the first network node to associate the first network node with a second hierarchical level of a replication hierarchy in a network;

receiving the multicast data from a second network node associated with a first hierarchical level of the replication hierarchy, the multicast data received at the first network node via a unique network address of the first network node, the unique network address of the first network node being different from the anycast address assigned to the first network node; and after registering the first leaf node with the first network node, replicating the multicast data to generate copies of the multicast data to be transmitted via respective unicast paths to respective ones of a plurality of leaf nodes, including the first leaf node, registered with the first network node to receive the multicast data.

15. The first network node of claim 14, wherein the source is a first source, the multicast data is first multicast data, and the operations further include receiving, at the first network node from a root node associated with a second source of second multicast data, a second message addressed to a second anycast address assigned to the first network node to register the root node with the first network node to permit sending of the second multicast data from the root node to the first network node, the second anycast address being different from the first anycast address.

16. The first network node of claim 14, wherein the operations further include sending a first one of the copies of the multicast data to the first leaf node via a first one of the unicast paths.

17. The first network node of claim 14, wherein the anycast address is assigned to a plurality of network nodes associated with the second hierarchical level of the replication hierarchy, the first network node included in the plurality of the network nodes.

18. The first network node of claim 17, wherein the multicast data received at the first network node is addressed to the unique network address of the first network node.

19. The first network node of claim 14, wherein the replication hierarchy includes a third hierarchical level in addition to the first hierarchical level and the second hierarchical level.

20. The first network node of claim 14, wherein the multicast data is first multicast data, and the operations further include discarding second multicast data received at the first network node when no leaf node is registered with the first network node to receive the second multicast data.

* * * * *